United States Patent
Mei et al.

(10) Patent No.: US 10,777,821 B2
(45) Date of Patent: Sep. 15, 2020

(54) CATALYST, ANODE, MEMBRANE ELECTRODE ASSEMBLY, WATER ELECTROLYSIS CELL, STACK, WATER ELECTROLYZER, AND HYDROGEN UTILIZING SYSTEM

(71) Applicant: Kabushiki Kaisha Toshiba, Minato-ku (JP)

(72) Inventors: Wu Mei, Yokohama (JP); Atsuko Iida, Yokohama (JP); Norihiro Yoshinaga, Yokohama (JP); Yoshihiko Nakano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 90 days.

(21) Appl. No.: 16/128,641

(22) Filed: Sep. 12, 2018

(65) Prior Publication Data

US 2019/0296362 A1    Sep. 26, 2019

(30) Foreign Application Priority Data

Mar. 22, 2018 (JP) .................. 2018-054815
Sep. 7, 2018 (JP) .................. 2018-167927

(51) Int. Cl.
| | | |
|---|---|---|
| *H01M 4/86* | (2006.01) | |
| *H01M 4/90* | (2006.01) | |
| *H01M 8/1004* | (2016.01) | |
| *H01M 8/1018* | (2016.01) | |

(52) U.S. Cl.
CPC ....... *H01M 4/8626* (2013.01); *H01M 4/9083* (2013.01); *H01M 8/1004* (2013.01); *H01M 2008/1095* (2013.01)

(58) Field of Classification Search
CPC ............. H01M 4/8626; H01M 8/1004; H01M 4/9083; H01M 4/8652; H01M 4/8657; H01M 4/8605; H01M 4/8642
See application file for complete search history.

(56) References Cited

U.S. PATENT DOCUMENTS

| | | | |
|---|---|---|---|
| 4,157,943 A | 6/1979 | Scarpellino, Jr. et al. | |
| 6,936,370 B1 | 8/2005 | Knights et al. | |
| 8,663,866 B2 * | 3/2014 | Raiford | H01M 4/8605 |
| | | | 429/483 |
| 2005/0261125 A1 | 11/2005 | Sagae | |
| 2010/0021787 A1 | 1/2010 | Wu et al. | |
| 2010/0239950 A1 | 9/2010 | Mei et al. | |
| 2012/0251915 A1 | 10/2012 | Mei et al. | |
| 2013/0078550 A1 | 3/2013 | Mei et al. | |
| 2013/0252132 A1 | 9/2013 | Mei et al. | |

(Continued)

FOREIGN PATENT DOCUMENTS

| | | |
|---|---|---|
| JP | 63-006636 | 2/1988 |
| JP | 2003-508877 | 3/2003 |

(Continued)

*Primary Examiner* — Stewart A Fraser
(74) *Attorney, Agent, or Firm* — Oblon, McClelland, Maier & Neustadt, L.L.P.

(57) ABSTRACT

A catalyst of an embodiment includes a porous structure including aggregates of particles containing Ru and metal atoms M different from Ru. The particles are a metal oxide. A metal atom ratio of the metal atom M in a surface region of the porous structure is higher than that of the metal atom M in the porous structure as a whole.

20 Claims, 8 Drawing Sheets

(56) References Cited

U.S. PATENT DOCUMENTS

| | | | |
|---|---|---|---|
| 2015/0311536 A1 | 10/2015 | Atanasoska et al. | |
| 2018/0248198 A1* | 8/2018 | Yadav ................ | H01M 4/8878 |
| 2018/0331368 A1* | 11/2018 | Kongkanand ....... | H01M 4/8892 |

FOREIGN PATENT DOCUMENTS

| | | |
|---|---|---|
| JP | 2005-334690 | 12/2005 |
| JP | 2007-265929 | 10/2007 |
| JP | 2008-108594 | 5/2008 |
| JP | 2010-221090 | 10/2010 |
| JP | 2012-204221 | 10/2012 |
| JP | 2013-082999 | 5/2013 |
| JP | 2013-226537 | 11/2013 |
| JP | 5342824 | 11/2013 |
| JP | 5676334 | 2/2015 |
| JP | 2016-503723 | 2/2016 |
| JP | 2016-108635 | 6/2016 |
| JP | 2017-127799 | 7/2017 |

* cited by examiner

CATALYST, ANODE, MEMBRANE ELECTRODE ASSEMBLY, WATER ELECTROLYSIS CELL, STACK, WATER ELECTROLYZER, AND HYDROGEN UTILIZING SYSTEM

CROSS-REFERENCE TO RELATED APPLICATION

This application is based upon and claims the benefit of priority from Japanese Patent Applications No. 2018-54815, filed on Mar. 22, 2018 and No. 2018-167927, filed on Sep. 7, 2018; the entire contents of which are incorporated herein by reference.

FIELD

Embodiments described herein relate to a catalyst, an anode, a membrane electrode assembly, a water electrolysis cell, a stack, a water electrolyzer, and a hydrogen utilizing system.

BACKGROUND

In recent years, research on electrochemical cells has actively been conducted. For example, polymer electrolyte membrane electrolysis cells (PEMEC) among electrochemical cells are superior in responsiveness to renewable energy of photovoltaic power generation and the like and so are expected to be utilized for generating hydrogen of large-scale energy storage systems. In order to ensure sufficient durability and electrolytic characteristics, noble metal catalysts such as platinum (Pt) nanoparticle catalysts for the cathode of PEMEC and iridium (Ir) nanoparticle catalyst for the anode are commonly used.

One big challenge for widespread use of PEMEC is the cost reduction by reducing the amount of use of noble metal catalysts. In particular, a significant reduction of the amount of noble metal catalyst used, which is used as an oxygen generating catalyst of the anode, is demanded.

Also, high activity of ruthenium (Ru) has been reported in oxygen generating catalysts. However, it becomes difficult to maintain oxygen generating activity and durability with dissolution of Ru accompanying an electrode reaction of water electrolysis. Therefore, a catalyst having high oxygen generating activity and durability is demanded.

DETAILED DESCRIPTION

A catalyst of an embodiment includes a porous structure including aggregates of particles containing Ru and metal atoms M different from Ru. The particles are a metal oxide. A metal atom ratio of the metal atom M in a surface region of the porous structure is higher than that of the metal atom M in the porous structure as a whole.

Figure 1:
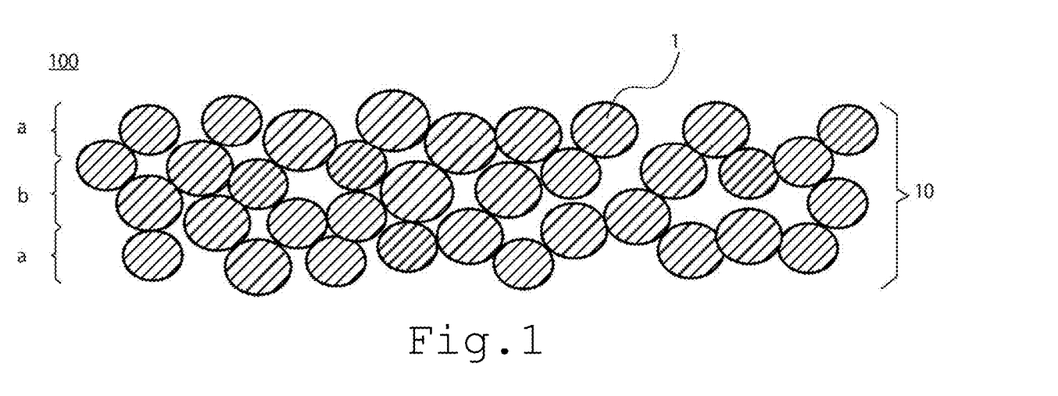
FIG. 1 is a conceptual diagram of a catalyst according to an embodiment.

FIG. 1 shows a conceptual diagram of a catalyst 100 according to an embodiment of the present disclosure. The catalyst 100 includes a porous structure 10 made up of aggregates of particles 1 containing Ru and metal atoms M different from Ru. The particle 1 is a metal oxide containing Ru and the metal atom M. The catalyst 100 is a catalyst suitable for a water electrolysis reaction. A membrane electrode assembly (MEA) can be manufactured by using the catalyst 100 as a catalyst layer according to the embodiment alone or a composite layer obtained by combining the catalyst 100 as a catalyst layer with, for example, a gas diffusion sheet or the like. The porous structure 10 is, for example, a layered material spreading out in a planar form. The particles 1 are two-dimensionally or three-dimensionally stacked and aggregated to form a three-dimensional porous structure 10.

The particles 1 aggregate to form the porous structure 10. The gap between the particles 1 is a hole of the porous structure 10. There is no specific limitation on the crystal structure of the particle 1, but considering the durability of the porous structure 10, a crystalline structure is preferable. The particles 1 may partly contain amorphous metal oxide. The porous structure 10 contains a large number of pores having an average diameter of 1 nm or more. If a porous structure containing a large number of pores is adopted, substance transportation can be suitably carried out also inside the porous structure 10.

The metal atom M is preferably an atom having high stability to the electrode reaction of water electrolysis. The metal atom M is preferably at least one metal atom selected from, for example, Ir, Rh, Au, Ta, W, Si, Ti, Zr, Sn, Pt, Pd, Hf, V, Mo, Cr, Co, Ni, Nb, Fe, Mn, Al, and Zn. As the metal atom M, at least one selected from Ir, Ta, Sn, and Al has particularly high durability in an oxidation state. From the viewpoint of enhancing the durability of the porous structure 10, the metal atom ratio of the metal atom M in a surface region a of the porous structure 10 is preferably higher than the metal atom ratio of the metal atom M in the whole of the porous structure 10.

The average composition of metal atoms contained in the porous structure 10 (the average composition of metal atoms in the whole of the porous structure 10) is represented by $Ru_xM_y$, wherein x and y in the formula are each atom ratios and x and y preferably satisfy $x+y=100$, $35 \leq x \leq 80$, and $20 \leq y \leq 65$. When x, which is the metal atom ratio of Ru in the porous structure 10 as a whole is less than 40, sufficient oxygen generating activity cannot be obtained and when the metal atom ratio exceeds 80, durability is low even when the metal atom M is contained and thus, x as the metal atom ratio of Ru in the porous structure 10 as a whole is preferably 40% or more and 80% or less. The particles 1 include forms like composite oxide particles of Ru oxide and metal atom M, a mixture of Ru oxide particles and oxide particles of metal atom M, a mixture of Ru oxide particles and composite oxide particles of Ru oxide and metal atom M, and oxide particles of metal atom M and composite oxide particles of Ru oxide and metal atom M and are not particularly limited.

The metal atom ratio of the metal atom M in the surface region a of the porous structure 10 is preferably higher than the metal atom ratio of the metal atom M in the porous structure 10 as a whole. That is, when the average composition of metal atoms in the surface region a of the porous structure 10 is expressed as $Ru_mM_n$ ( ), m and n in the formula are each atom ratios and it is preferable that m and n satisfy m+n=100 and 60<n<100 and y as the metal atom ratio of the metal atom M in the porous structure 10 as a whole and n as the metal atom ratio of the metal atom M in the surface region a of the porous structure 10 satisfy y>n. At this point, the gain of Ru exhibiting high oxygen generating activity is utilized and Ru is protected by the atom M having high stability against an electrode reaction of water electrolysis so that deterioration of the porous structure 10 is suppressed. It is more preferable that m, which is the metal atom ratio of Ru in the surface region a of the porous structure 10, is 30 or less because further deterioration of the porous structure 10 can be suppressed. In the porous structure 10 according to the present embodiment, it is also possible to use a catalyst mixed with another noble metal catalyst such as platinum.

If the content ratio of the metal element M is increased as a whole, the durability is improved, but the catalytic activity is lowered. Because the porous structure 10 according to the embodiment has a large number of pores inside and thus, substances can smoothly be transported into the porous structure 10. By increasing the metal atom ratio of Ru inside the porous structure 10 and increasing the metal atom ratio of the metal element M on the surface side of the porous structure 10, both high catalytic activity and high durability can be achieved at the same time. The thickness of the surface region a is 3 nm or less from the surface of the porous structure 10. More specifically, the surface region a of the porous structure 10 is a region from the surface of the porous structure 10 to a depth of 3 nm in the thickness direction of the porous structure 10. The surface of the porous structure 10 is a surface selected so that the area of two opposed faces of the porous structure 10 is the maximum and when the catalyst 100 is used for a membrane electrode assembly, one surface of the porous structure 10 faces an electrolyte membrane and the other surface faces the substrate of the electrode. The other surface of the porous structure 10 is defined as a side surface. A region excluding the surface region a on both sides of the porous structure 10 is defined as an internal region b.

From the viewpoint of enhancing the durability of the porous structure 10 in consideration of activity of the catalyst 100, n as the metal atom ratio of the metal atom M in the surface region a of the porous structure 10 and y as the metal atom ratio of the metal atom M in the porous structure 10 as a whole preferably satisfy 1.2≤n/y≤8.0. From the same viewpoint, n, which is the metal atom ratio of the metal atom M in the surface region a of the porous structure 10, more preferably satisfies 70<n<100.

n as the metal atom ratio of Ru in the surface region a of the porous structure 10 and x as the metal atom ratio of the metal atom Ru in the porous structure 10 as a whole preferably satisfy 0.0<n/x≤0.6.

The thickness of the porous structure 10 is preferably 7 nm or more and 100 nm or less. If the thickness is less than 7 nm, the durability of the porous structure 10 is often insufficient. If the thickness exceeds 100 nm, the utilization efficiency of the catalyst in the internal region b (between the surface region a and the surface region a) of the porous structure 10 is low. The thickness is more preferably 10 nm or more and 50 nm or less from the viewpoint of structural stability. This is because if the thickness of the porous structure 10 is within this range, it is possible to maintain sufficient catalyst durability without lowering the utilization efficiency of the catalyst. In addition, at least in the porous structure 10, the internal region b of the porous structure 10 exists. The thickness of the porous structure 10 is the distance between the two surfaces of the porous structure 10.

If the diameter of the particle 1 is 1 nm or more and 20 nm or less, the utilization efficiency of the catalyst is increased, which is preferable. The diameter of the particle 1 is more preferably 3 nm or more and 20 nm or less. The diameter in the embodiment represents the diameter of a circumscribed circle. The particles 1 include those having a core-shell structure. That is, there are cases in which the particles 1 which have spread to one layer and aggregated constitute the porous structure 10. It is often observed that the atom ratio of Ru is 30% or less in a thickness of 0.2 nm or more and 1 nm or less from the surface of the particles 1.

Figure 2:
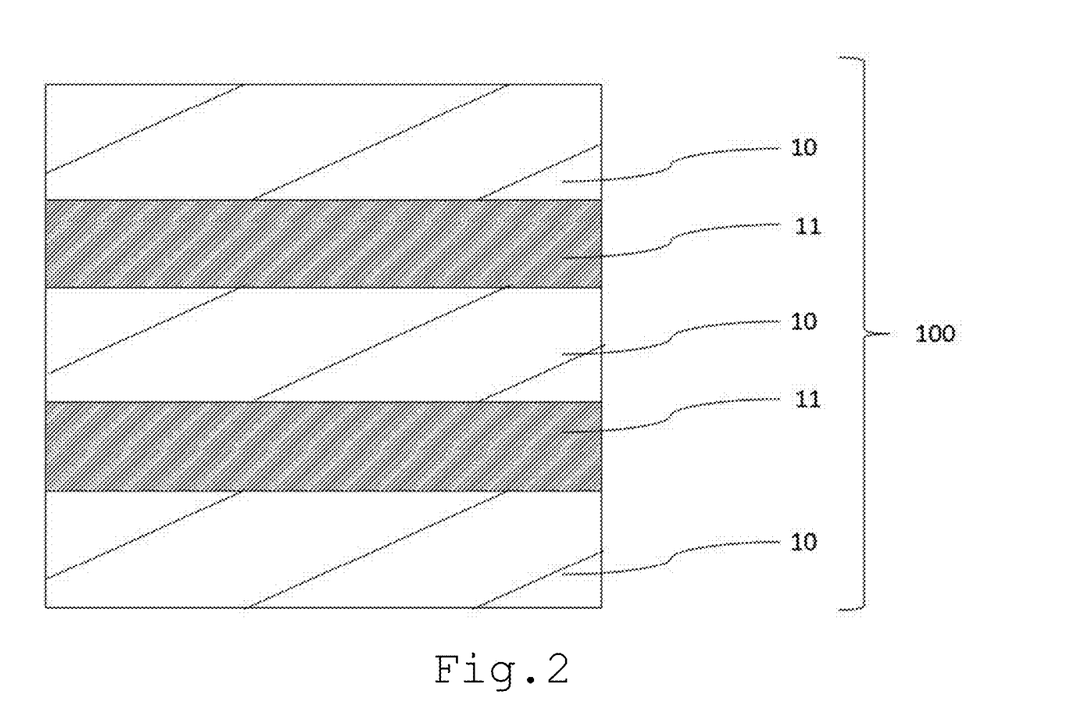
FIG. 2 is a conceptual diagram of the catalyst according to an embodiment.

At least a portion of the catalyst 100 includes also a laminated structure in which the porous structure 10 and a void 11 are alternately laminated. FIG. 2 shows a structure of the catalyst 100 of lamination type according to an embodiment. Unlike the pores of the porous structure 10, the voids 11 are layered voids spreading out in a planar form. The thickness of the void 11 is typically 10 nm or more and 100 nm or less. In FIG. 2, the porous structures 10 sandwiching the void 11 are separated, but in an actual catalyst 100, the porous structures 10 sandwiching the void 11 are connected.

Figure 3A:
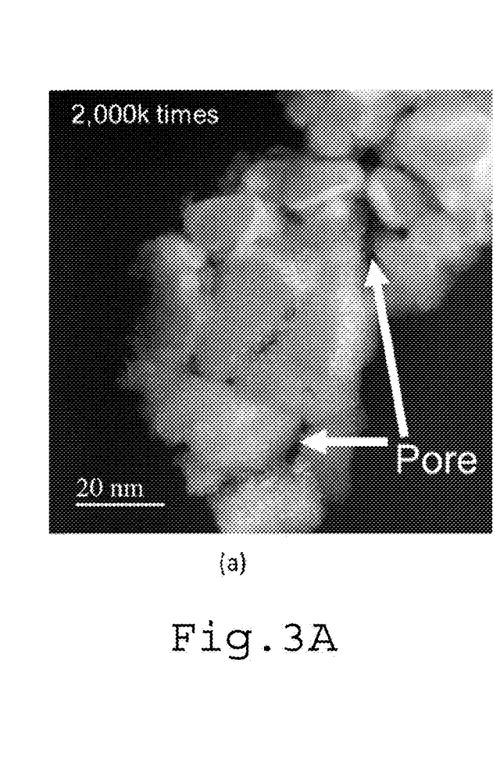
FIGS. 3A to 3C are TEM photographs showing the catalyst according to an embodiment.
Figure 3B:
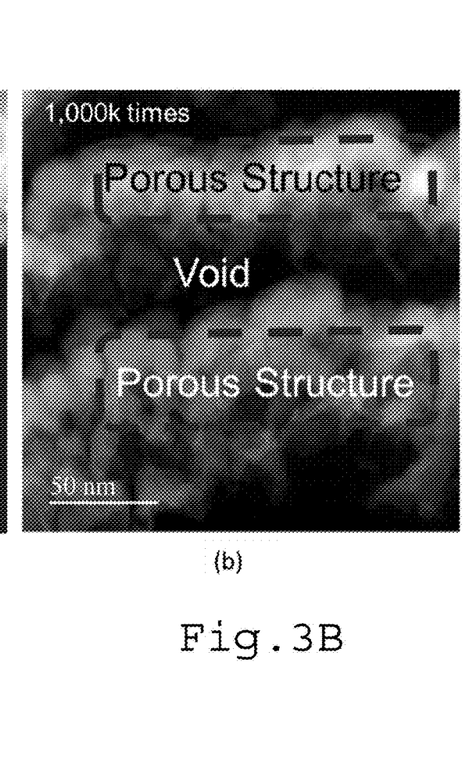
Figure 3C:
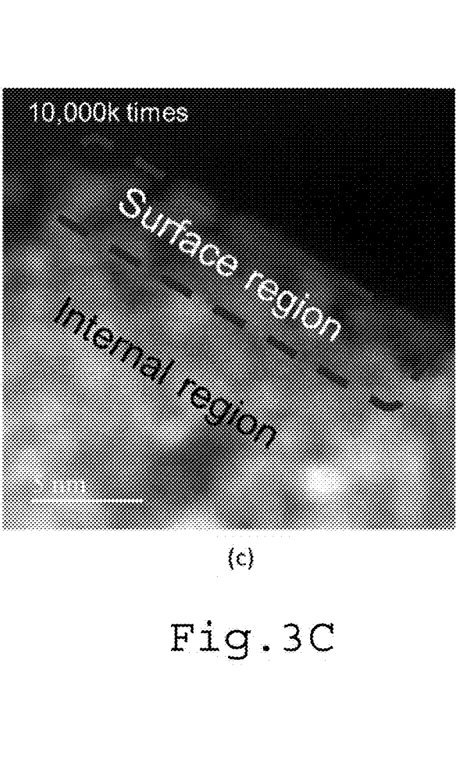

FIGS. 3A to 3C show transmission electron microscope (TEM) photographs showing the catalyst 100 according to an embodiment. As shown in FIG. 3A, the porous structure 10 is a porous layer in which porosity is formed between particulate catalysts. As shown in FIG. 3B, the porous structure 10 and the void 11 are at least partially laminated alternately in a lamination direction. By using the catalyst 100 of lamination type, the structure of the porous structure 10 becomes more stable and also the substance transportation necessary for the catalytic reaction becomes smoother. In addition, because the catalyst 100 according to the embodiment maintains high catalytic activity, the catalytic activity is high over a long period of time and so the amount of the precious metal catalyst can be reduced.

FIG. 3C is a high magnification SEM photograph of 10,000,000 times. Composition distributions of metal atoms and particle 1 of the porous structure 10 can be measured at nanoscale level by energy dispersive X-ray spectrometry (EDX)

Figure 4:
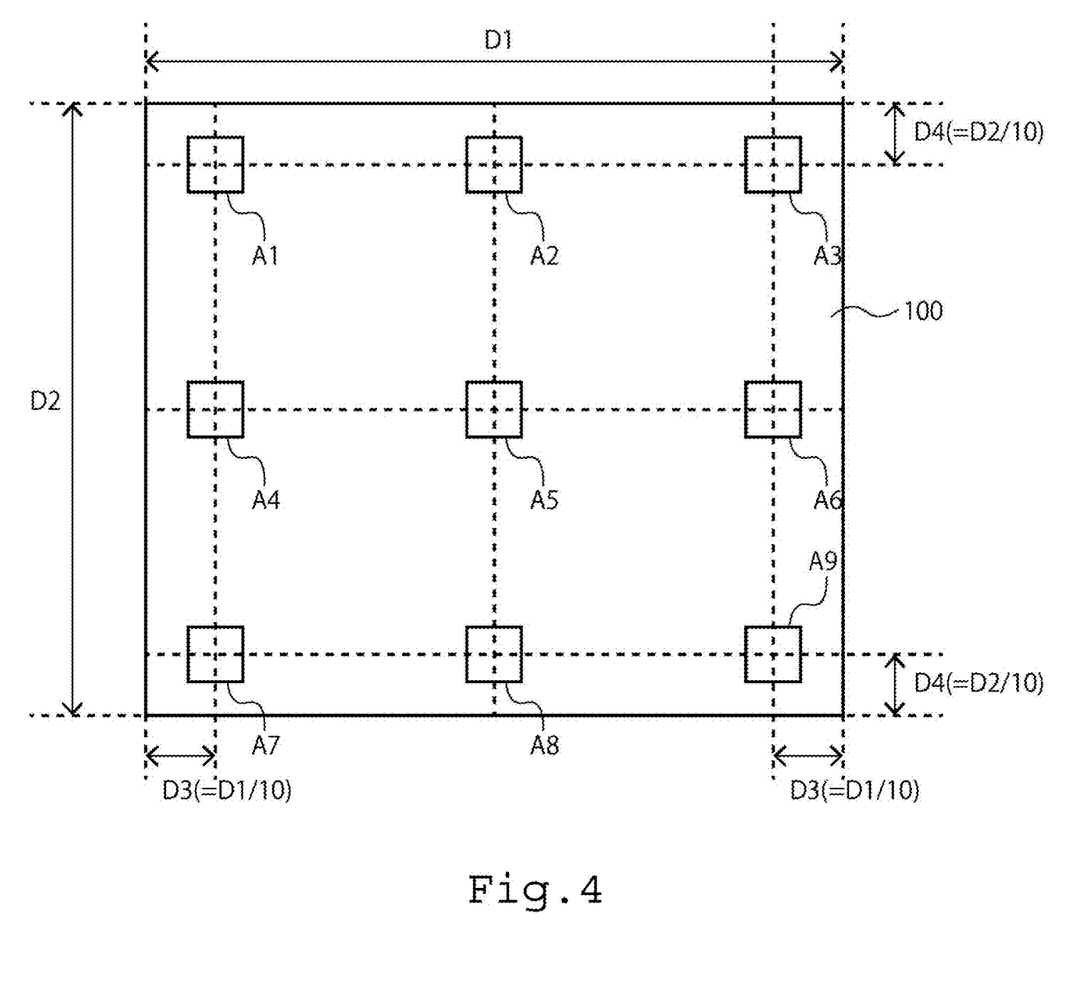
FIG. 4 is a diagram illustrating an analysis spot of the catalyst according to an embodiment.

The average composition of metal atoms of the porous structure 10 and the average composition of metal atoms in the surface region could be confirmed by composition analysis using a transmission electron microscope and were evaluated as follows. First of all, nine spots A1 to A9 on the surface of the catalyst 100 (porous structure 10) are determined as shown in the diagram illustrating analysis spots of the catalyst 100 according to an embodiment in FIG. 4. Each spot has a square shape and an area of at least 5 mm². Then, as shown in FIG. 4, when a catalyst length D1 and a catalyst width D2 (D1≥D2) are set, an imaginary line is drawn at a distance of D3 (=D1/10) inward from each of two opposite sides in a width direction of the catalyst 100, an imaginary line is drawn at a distance of D4 (=D2/10) inward from each of two opposite sides in a length direction of the catalyst 100 and further, an imaginary line parallel to the width direction passing through the center of the catalyst 100 is drawn, and an imaginary line parallel to the length direction passing through the center of the catalyst 100 is drawn to adopt regions centered on nine intersection points of the imaginary lines as observation spots A1 to A9. The observation cross section by SEM or TEM is perpendicular to the plane of FIG. 4.

A cross section of each spot was cut out to prepare a cross section sample for TEM observation. Nine samples of each spot were each observed with TEM in three places. The porous structure 10 and the void 11 were distinguished from each other based on the contrast after obtaining a TEM image of 10 million times. Using the TEM image of 10 million times obtained from each place, the thickness of the porous structure 10 at three places in each field of view and the average value of measured values of each sample were calculated as the average thickness of the porous structure 10. Further, the average composition of metal atoms in the porous structure 10 as a whole, the average composition of metal atoms in the surface region, and the average composition of metal atoms in the internal region were measured in the thickness direction by EDX to determine the composition ratio (atomic concentration ratio) of the atom M and Ru in the porous structure 10 as a whole, the surface region a, and the internal region b. The average composition and the average value of the metal atom ratio were obtained from the measured values.

A method of manufacturing the catalyst 100 according to the present embodiment will be described.

In order to form an M atom-rich structure on a substrate (not shown) or the like, sputtering is performed using a mixture having a low Ru/M atom ratio or M atoms to form a first layer (step 1). Next, sputtering is performed using a mixture having a high Ru/M atom ratio or Ru to form a second sub-layer (step 2). A third sub-layer is formed using a mixture having a low Ru/M atom ratio or the atom M (step 3). When the catalyst 100 of lamination type is produced, a pore-forming agent material as a precursor of the voids 11 that is easily removed by washing or the like is sputtered (step 4). Steps 1 to 4 are repeated a plurality of times to obtain a laminate (catalyst 100 precursor) in which a plurality of pore-forming materials is laminated. Next, pore-forming treatment is carried out by washing with alkali or acid (step 5). Accordingly, the pore-forming material portion becomes the void 11 and a catalyst layer 24 is formed. When the catalyst 100 not including the void 11 is produced, the catalyst 100 can be produced by steps 1 to 3.

For the sputtering described above, a reactive sputtering method in which an oxygen gas is added to the chamber can be adopted. The durability of the catalyst can be improved by optimizing parameters such as the partial pressure of an oxygen gas, the power supply power during sputtering or vapor deposition, the substrate temperature, and the like. Further, by performing heat treatment on the sputtered or washed catalyst at 300 to 600° C. for five minutes to four hours in the atmosphere, the structure of the surface region can be strengthened so that durability can be greatly improved.

Figure 5:
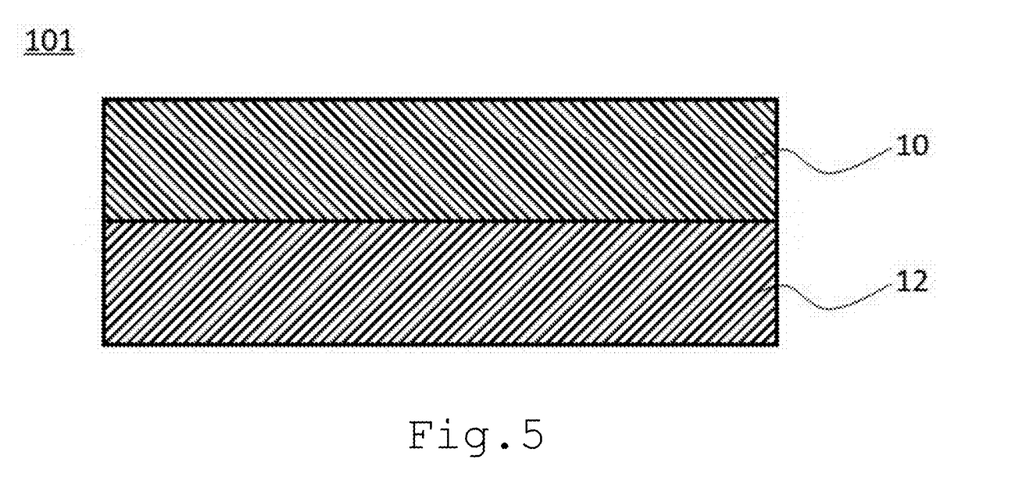
FIG. 5 is a conceptual diagram of an electrode according to an embodiment.

Note that an electrode 101 using the catalyst 100 can be formed. The electrode 101 is suitable as an anode of a membrane electrode assembly for water electrolysis, a water electrolysis cell, a stack, and a water electrolyzer. As shown in the conceptual diagram of the electrode 101 in FIG. 5, the electrode 101 may be, for example, a configuration in which a catalyst is provided on a substrate 12.

Second Embodiment

Figure 6:
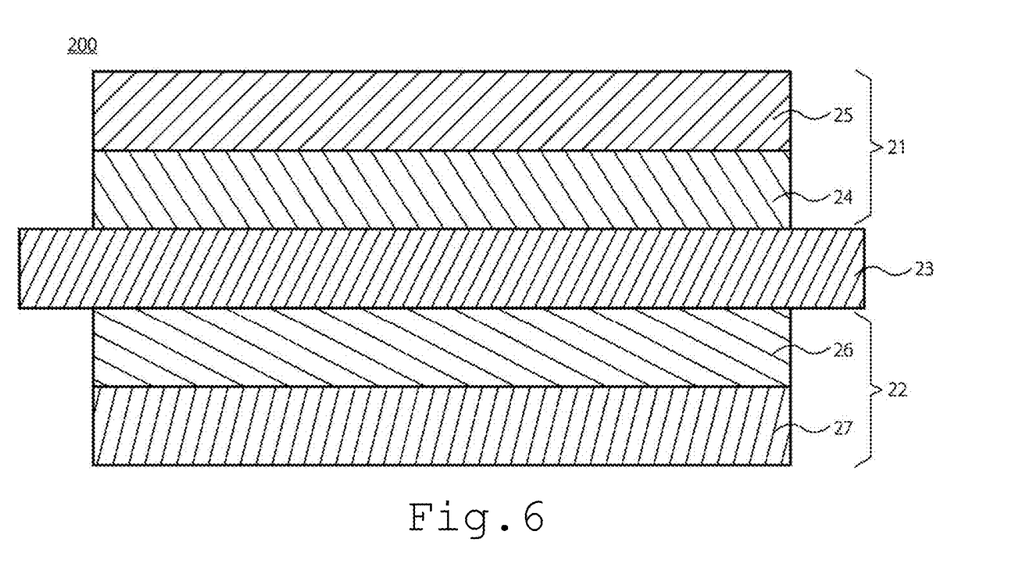
FIG. 6 is a sectional view of a membrane electrode assembly according to an embodiment.

FIG. 6 shows a sectional view of a membrane electrode assembly (MEA 200) according to an embodiment of the present disclosure.

The MEA 200 includes a first electrode 21 as an anode, a second electrode 22 as a cathode, and an electrolyte membrane 23 provided between the first electrode 21 and the second electrode 22. When the MEA 200 is used for water electrolysis, the MEA 200 exhibits high oxygen generating activity and durability.

The first electrode 21 is adjacent to one side of the electrolyte membrane 23 and includes the catalyst layer 24 adjacent to the electrolyte membrane 23 and a first gas diffusion layer (substrate) 25 adjacent to the catalyst layer 24.

The second electrode 22 is adjacent to the other side of the electrolyte membrane 23 and includes a catalyst layer 26 adjacent to the electrolyte membrane 23 and a second gas diffusion layer (substrate) 27 adjacent to the catalyst layer 26.

The electrolyte membrane 23 is a membrane with good proton conductivity and is electrically insulated. As an electrolyte membrane having proton conductivity, for example, a fluororesin having a sulfonic group (for example, Nafion (trademark, manufactured by Du Pont), Flemion (trademark, manufactured by Asahi Kasei Corporation), and Aciplex (trademark, manufactured by Asahi Glass Co., Ltd.) or an inorganic substance such as tungstic acid and phosphotungstic acid can be used.

The thickness of the electrolyte membrane 23 can appropriately be determined in consideration of characteristics of the MEA 200. From the viewpoint of strength, solubility resistance, and output characteristics of MEA, the thickness of the electrolyte membrane 23 is preferably 10 µm or more and 200 µm or less. The thickness in the embodiment represents the average thickness in the lamination direction. The lamination direction in the embodiment represents a direction from the second electrode 22 toward the first electrode 21.

The catalyst layer 26 may be a catalyst used in the cathode and, for example, a Pt nanoparticle catalyst is used. When the catalyst layer 26 in which the Pt nanoparticle catalyst and the void are alternately laminated in the lamination direction is used, the structure of the particulate catalyst becomes more stable and also the substance transportation becomes smoother. In addition, the amount of noble metal catalyst can be reduced.

For the catalyst layer 24, it is preferable to use the catalyst 100 in the first embodiment.

As the substrates 25 and 27, a material having high porosity and high conductivity is used. The substrate 25 is used as an anode of a water electrolysis cell and thus, a titanium (Ti) material having high durability is used and, for example, a Ti mesh, a cloth made of Ti fibers, a Ti sintered body, or the like is used. The substrate 27 is used as a cathode of a water electrolysis cell and, for example, carbon paper or the like is used. The water electrolysis activity is improved by adjusting the opening ratio of the substrates 25 and 27 or the vacancy structure of a portion in contact with the catalyst layers 24 and 26, or by blasting of the surface of the substrates 25 and 27. This can be considered because the water supply to the catalyst layers 24 and 26 and the discharge of electrode reaction products become smooth, promoting an electrode reaction in the catalyst layers 24 and 26. A coating layer may also be provided on the substrates 25 and 27. Durability of the electrodes 21 and 22 may be improved by a conductive closely-packed coating layer. The coating layer is not particularly limited and metallic materials, oxide, ceramic materials such as nitride, carbon, and the like can be used. Durability can further be improved by forming a multilayer structure or an inclined structure constructed of different materials in the coating layer. In the case of using Ti for the substrate, an oxide containing Ir having a thickness of 10 nm or more is particularly effective as the coating layer. A dense composite oxide layer of Ir and Ti is considered to be formed in the coating layer.

A method of manufacturing the MEA 200 according to the present embodiment will be described.

The catalyst layers 24 and 26 and the electrolyte membrane 23 are heated, pressurized, and joined to each other to manufacture the MEA 200. When the forming substrate of the catalyst layers 24 and 26 is a transfer substrate, the catalyst layers 24 and 26 are transferred from the transfer substrate to the electrolyte membrane by heating/pressurization and then, a gas diffusion layer (corresponding to the substrates 25 and 27) is arranged on the catalyst layers 24 and 26 and joined with the counter electrode to be able to produce the MEA 200.

Each member as described above is commonly joined by using a hot pressing machine. The pressing temperature is a temperature higher than the glass transition temperature of a polymer electrolyte used as a bonding agent of the electrodes 21 and 22 and the electrolyte membrane 23 and is 100° C. or higher and 300° C. or lower. The pressing pressure and the pressing time depend on the hardness of the electrodes 21 and 22 and, for example, the pressure is 5 kg/cm$^2$ or more and 200 kg/cm$^2$ or less and the time is between five sec and 20 min.

A process as described below may also be adopted to join the catalyst layers 24 and 26 and the electrolyte membrane 23. The electrolyte membrane 23 is formed on the substrate 27 with the catalyst layer 26 and the substrate 25 with the catalyst layer 24 of the counter electrode is formed thereon. If the substrate 27 is a gas diffusion layer, the substrate 27 can directly be used as the MEA 200. If the substrate is a transfer substrate, the substrate is used as the MEA 200 after the gas diffusion layer is replaced.

As described above, the MEA 200 according to an embodiment has high oxygen generating activity and durability even with a small amount of noble metal.

Third Embodiment

Figure 7:
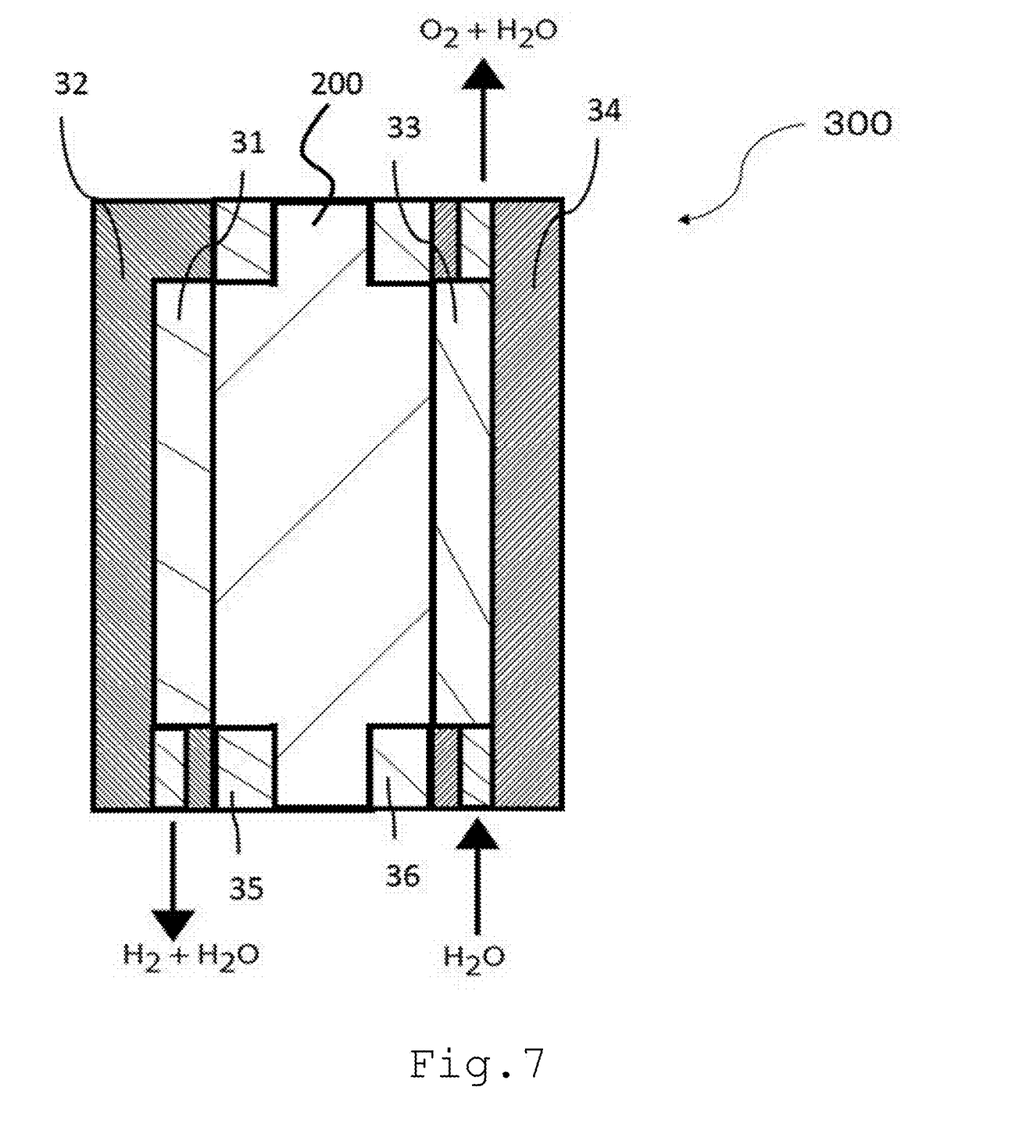
FIG. 7 is a sectional view of a water electrolysis cell in an embodiment.

FIG. 7 shows a sectional view of a water electrolysis cell 300 according to a third embodiment.

As shown in FIG. 7, the water electrolysis cell 300 according to the third embodiment includes the MEA 200, a cathode power feeder 31, a separator 32, an anode power feeder 33, a separator 34, a gasket (seal) 35, and a gasket (seal) 36. The cathode power feeder 31 and the anode power feeder 33 may be any body that is conductive and can conduct gas and water. Further, the power feeders 31 and 33 may be integrated with the separators 32 and 34. More specifically, the separator may have a flow path through which water or a gas flows or may be one having a porous body, but the separator is not limited thereto.

In the water electrolysis cell 300 of FIG. 7, an electrode (not shown) connects the cathode power feeder 31 and the anode power feeder 33, and a reaction occurs in the cathode and the anode. Water is supplied to the anode, and water is decomposed into protons, oxygen, and electrons in the anode electrode. The support of the electrode and the power feeder are porous bodies, and the porous bodies function as a flow path plate. The generated water and unreacted water are discharged, and protons and electrons are used for a cathode reaction. In the cathode reaction, protons and electrons react to produce hydrogen. Either one or both of the generated hydrogen and oxygen are used, for example, as fuel for a fuel cell. The MEA 200 is held by the separators 32 and 34 and airtightness is maintained by the gaskets (seals) 35 and 36.

Fourth Embodiment

Figure 8:
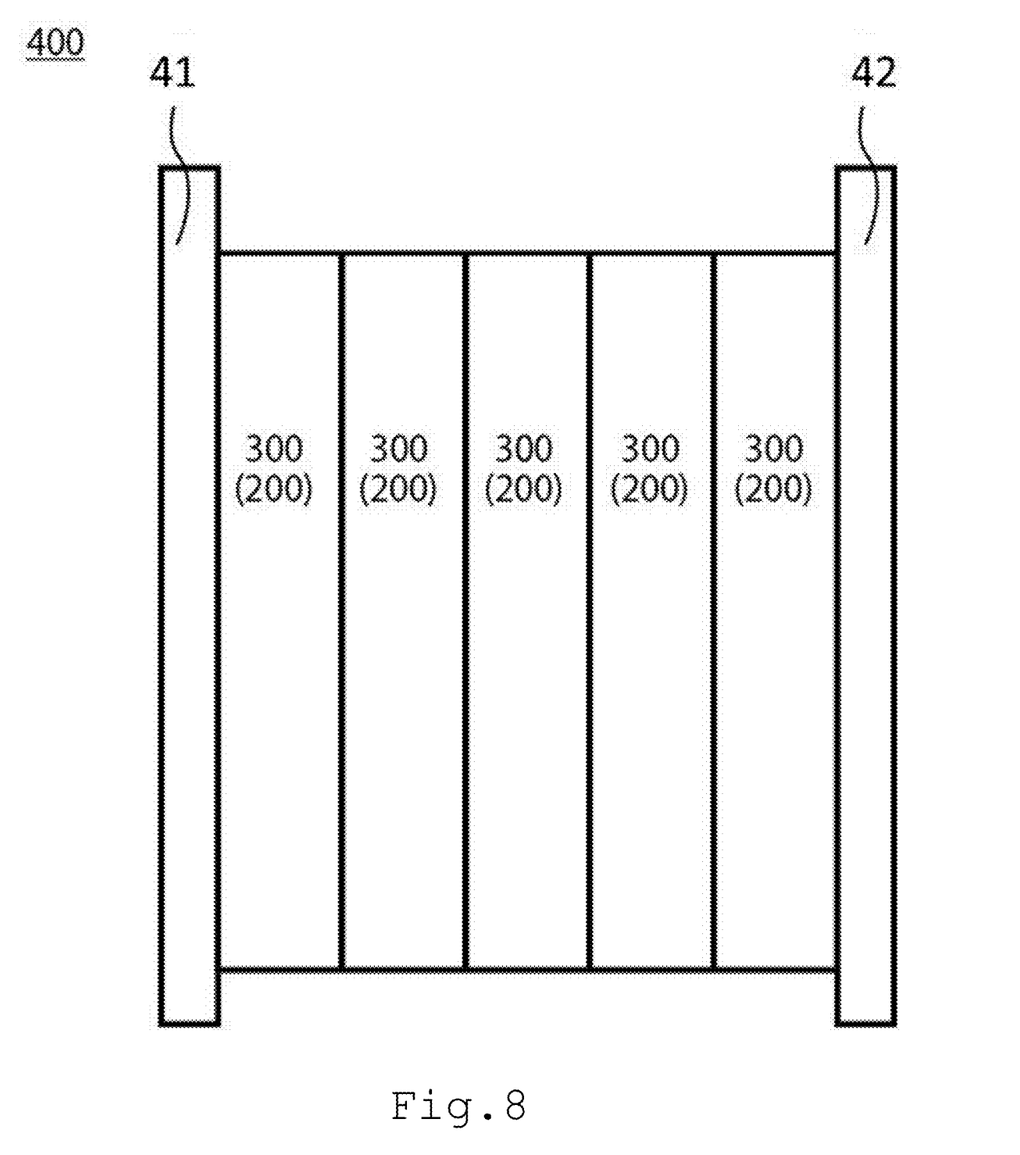
FIG. 8 is a diagram showing a stack in an embodiment.

FIG. 8 is a diagram showing a stack according to a fourth embodiment.

In a stack 400 according to the fourth embodiment shown in FIG. 8, a plurality of MEAs 200 or water electrolysis cells 300 is connected in series. Tightening plates 41 and 42 are attached to both ends of the water electrolysis cell.

The voltage by one MEA 200 or water electrolysis cell 300 is low and thus, a high voltage can be obtained by constructing the stack 400 in which a plurality of MEA 200 or water electrolysis cells 300 is connected in series. A water electrolysis cell 300 having only single MEA 200 can generate only small amount of hydrogen. The stack 400 having water electrolysis cells 300 connected in series can generate large amount of hydrogen.

Fifth Embodiment

Figure 9:
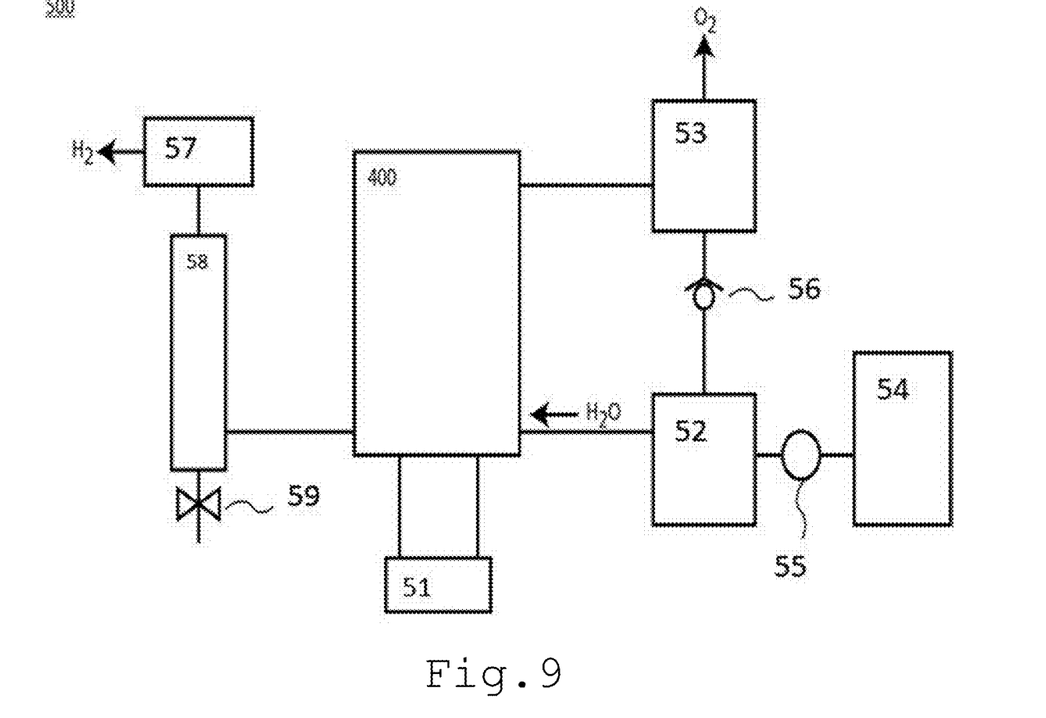
FIG. 9 is a diagram showing a water electrolyzer according to an embodiment.

FIG. 9 is a diagram showing a water electrolyzer according to a fifth embodiment.

In the fifth embodiment, the stack 400 is used for a water electrolyzer 500. As shown in FIG. 9, water electrolysis cells stacked in series are used as the stack 400 for water electrolysis. A power supply 51 is attached to the stack 400 for water electrolysis, and a voltage is applied between the anode and the cathode. A gas-liquid separator 52 for separating generated gas and unreacted water and a mixing tank 53 are connected to the anode side of the stack 400 for water electrolysis and water is sent to the mixing tank 53 by a pump 55 from an ion exchanged water producing apparatus 54 that supplies water for mixing in the mixing tank 53 through a check valve 56 from the gas-liquid separator 52 before being circulated to the anode. Oxygen generated in the anode passes through the gas-liquid separator 52 so that an oxygen gas is obtained. On the other hand, a hydrogen purification device 58 is connected to the cathode side subsequent to a gas-liquid separator 57 to obtain high purity hydrogen. Impurities are discharged via a path having a valve 59 connected to the hydrogen purification device 58. In order to control the operating temperature in a stable manner, it is possible to control the heating of the stack and a mixing tank, the current density during thermal decomposition, and the like. In addition to the stack 400, the water electrolyzer 500 can use the MEA 200 and the water electrolysis cell 300.

Sixth Embodiment

Figure 10:
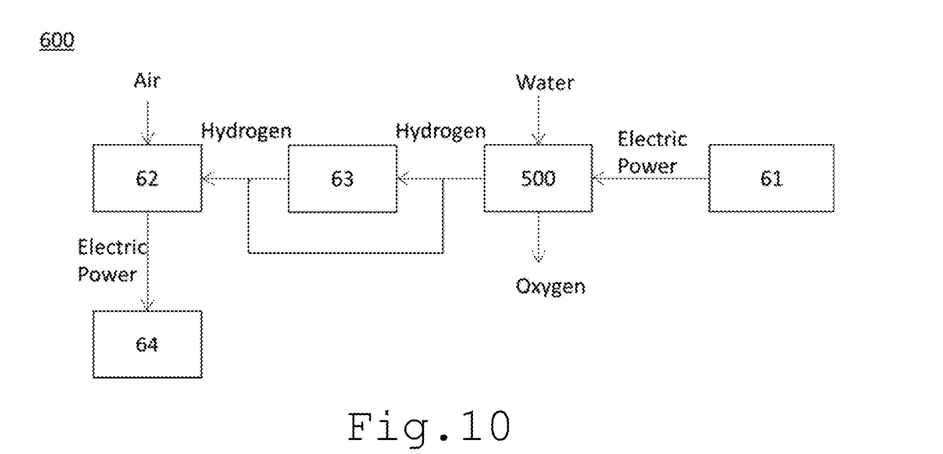
FIG. 10 is a diagram showing a hydrogen utilizing system according to an embodiment.
Figure 11:
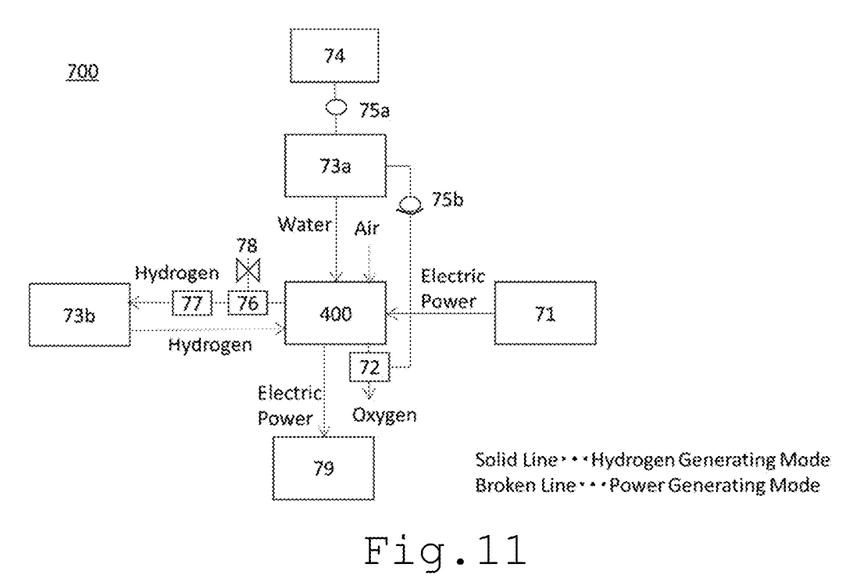
FIG. 11 is a diagram showing a hydrogen utilizing system according to an embodiment.

FIG. 10 is a diagram showing a hydrogen utilizing system according to a sixth embodiment.

The water electrolyzer is used in the sixth embodiment. As shown in FIG. 10, electric power generated from power generator 61 such as solar power or wind power is transformed to hydrogen gas in the water electrolyzer. Additionally, hydrogen gas is directly supplied to a hydrogen generator 62 or is supplied to a hydrogen generator 62 via a hydrogen gas tank 63. Hydrogen gas is transformed to electrical power by reacting with air in the hydrogen generator 62, electrical power can be used in a drive unit 64 as electric power. For example, hydrogen gas turbine, fuel cell and the like can be used as the hydrogen generator 62. For example, car, home appliances, industrial equipment and the like can be used as the drive unit 64. By using the electrode according to this invention, the hydrogen utilizing system of sixth embodiment with low power and high durability can be built.

Seventh Embodiment

FIG. 10 is a diagram showing a hydrogen utilizing system according to a sixth embodiment.

In the seventh embodiment, a utilized regenerative fuel cell (URFC) that switches hydrogen production by water electrolysis and power generation is equipped. The water electrolysis stack 400 can be used as the utilized regenerative fuel cell. As shown in FIG. 8, water electrolysis cells stacked in series are used as the water electrolysis stack 400. A power generator 71 such as solar power generator, wind power generator, and the like is attached to the water electrolysis stack 400. Voltage is applied between anode and cathode in a hydrogen generating mode. At the anode part, the water electrolysis stack 400 is connected to a gas-liquid separator 72 and a mixing tank 73a that separate generated gas and non-reacted water. Water is sent to mixing tank 73a from an ion exchanged water producing apparatus 74 that sent water using a pump 75a. And water passes a check bulb 75b from the gas-liquid separator 72, water is mixed in the mixing tank 73a, and water is circulated into the anode. Oxygen generated at anode passes the gas-liquid separator 72, and oxygen gas is obtained. At the cathode side, the water electrolysis stack 400 is connected to a gas-liquid separator 76 with a hydrogen purification device 77 and generates high purity hydrogen gas. The high purity hydrogen gas is stocked in a hydrogen gas tank 73b. Impurity material is discharged via a line including a bulb 78 connected to a gas-liquid separator 76.

The high purity hydrogen gas stocked in the hydrogen gas tank 73b is supplied to the water electrolysis stack 400 and reacts with outside air in a power generating mode. The high purity hydrogen gas is transformed in to electric power with such fuel cell reaction, electric power can be used for a drive unit 79. For example, car, home appliances, industrial equipment and the like can be used as the drive unit 79. By using the electrode according to this invention, the hydrogen utilizing system of seventh embodiment being compact size with low power and high durability can be built.

EXAMPLES

Hereinafter, examples and comparative examples will be described.

<Electrode Production>

(Preparation of PEMEC Standard Cathode)

Carbon paper Toray060 (manufactured by Toray Industries, Inc.) having a carbon layer of the thickness 1 μm or more and 50 μm or less was prepared as the substrate 27. The catalyst layer 26 in which Pt and voids were alternately laminated was formed by sputtering Pt onto the substrate so as to have a loading density of 0.1 mg/cm$^2$ to obtain the electrode 22. The electrode was used as the standard cathode electrode in Examples 1 to 7 and Comparative Examples 1 to 3.

PEMEC Anode Production, Examples 1 to 7, Comparative Examples 1 to 3

A titanium mesh substrate whose surface has been treated was prepared as the substrate 25. The electrode 22 including the catalyst layer 24 on the substrate 25 by sputtering was obtained. In sputtering, the process was adjusted so that the structure and composition of the catalyst had the values shown in Table 1 above. Then, heat treatment was performed in the atmosphere at 300° C. to 600° C. for five minutes to four hours.

The structures and compositions of various produced catalysts were evaluated as follows. First, samples of nine spots were cut out from the electrodes 22 obtained in Examples 1 to 7 and Comparative Examples 1 to 3. Next, samples were cut from the center of the samples of nine spots to produce samples for TEM observation. Nine samples of each electrode were each observed with TEM at three places. A TEM image of 10 million times was obtained, and the catalyst, pores, and voids were distinguished based on the contrast. Using the TEM image of 10 million times obtained from each place, the thickness of the porous structure 10 at three places in each field of view and the average value of measured values of each sample were calculated as the average thickness of the porous structure 10. Also, the average composition of metal atoms of the porous structure 10 and the average composition of metal atoms in the surface region were measured to determine the composition ratio of the atoms M and Ru.

TEM observations of the catalyst layers 24 in Examples 1 to 7 and Comparative Examples 1 and 3 were made to find that the catalyst layers 24 all contained the porous structure 10 and the void 11 and that the thickness of the porous structure 10 was 7 nm or more and 100 nm or less in all cases. The catalyst particles of Examples 1 to 7 and Comparative Examples 1 to 3 were all 3 to 20 nm in size and were verified to be connected.

<Production of MEA for PEMEC>

A 4 cm×4 cm square section was cut from the PEMEC standard cathode and various PEMEC anodes. Various PEMEC MEAs were obtained by combining and joining by thermocompression bonding the standard cathode, an electrolyte membrane (Nafion 117 (manufactured by Du Pont)), and various anodes (the electrode area is about 16 cm$^2$ and thermocompression bonding conditions: at 120° C. to 200° C. and 10 to 200 kg/cm$^2$ (pressure) for 10 sec to 5 min).

<Production of PEMEC Single Cells>

The obtained MEA was set between two separators provided with a flow path to produce a PEMEC single cell (water electrolysis cell).

Using the produced single cell, the stability of the PEMEC against the electrode reaction of water electrolysis was evaluated.

For the obtained single cell, the cell temperature was maintained at 80° C. and water was supplied to the anode. A voltage of 1.3 to 2.5 V was applied to the single cell, and water electrolysis was carried out for about five hours as conditioning of the MEA. Then, a voltage was applied to the single cell so that the current density became 2.0 A/cm$^2$, the voltage (V) after continuous water electrolysis for one hour was used as a voltage characteristic index of water electrolysis, and the voltage of each electrode is summarized in Table 1.

Regarding the stability of water electrolysis, PEMEC was subjected to 20,000 potential cycles (square wave: anode 1.2 v, 3 s; anode 2.5 v, 3 s) and then, a voltage was applied to the single cell so that the current density became 2.0 A/cm$^2$ and the voltage (Vf) after continuous water electrolysis for one hour was adopted as a voltage characteristic index of water electrolysis to determine a voltage regulation ((V0−Vf)/V0) caused by potential cycles. The stability was evaluated according to the following criteria, and the evaluation results of each electrode are summarized in Table 1.

Voltage deterioration rate <10% A; Voltage deterioration rate 10-25% B: Voltage deterioration rate >25% C;

Also, Table 1 summarizes observation results of the electrodes of Examples 1 to 7 and Comparative Examples 1 to 3, evaluation results of PEMEC, and the like.

TABLE 1

|  | Catalyst form | Overall composition | Surface area composition | Electrolytic property (V) | Stability |
|---|---|---|---|---|---|
| Example 1 | Porous structure | $Ru_{60}Ir_{40}$ | $Ru_{20}Ir_{80}$ | 1.75 | A |
| Example 2 | Porous structure | $Ru_{70}Ir_{30}$ | $Ru_{30}Ir_{70}$ | 1.74 | B |
| Example 3 | Porous structure | $Ru_{40}Ir_{60}$ | $Ru_{20}Ir_{80}$ | 1.78 | B |
| Example 4 | Porous structure | $Ru_{65}Ir_{20}Ta_{15}$ | $Ru_{10}Ir_{70}Ta_{20}$ | 1.75 | A |
| Example 5 | Porous structure | $Ru_{55}Ir_{20}Sn_{25}$ | $Ru_{10}Ir_{70}Sn_{20}$ | 1.76 | A |
| Example 6 | Porous structure | $Ru_{60}Ir_{20}Sn_{20}$ | $Ru_{10}Ir_{80}Al_{10}$ | 1.77 | A |
| Example 7 | Porous structure | $Ru_{75}Ir_{10}Ta_{15}$ | $Ru_{15}Ir_{70}Ta_{10}Sn_{5}$ | 1.73 | B |
| Comparative Example 1 | Particle | $Ru_{30}Ir_{70}$ | $Ru_{30}Ir_{70}$ | 1.80 | C |
| Comparative Example 2 | Porous structure | $Ru_{60}Ir_{40}$ | $Ru_{35}Ir_{55}$ | 1.75 | C |
| Comparative Example 3 | Porous structure | $Ru_{85}Ir_{15}$ | $Ru_{20}Ir_{80}$ | 1.72 | C |

As shown in Table 1, it is clear that the MEA of Examples 1 to 7 has a lower electrolytic voltage (V) required for PEMEC and higher efficiency of water electrolysis than Comparative Examples 1 to 3. Regarding the stability, the voltage deterioration rates of Examples 1 to 7 are lower than those of Comparative Examples 1 to 3. The catalysts of Comparative Examples 2 and 3 are inferior in stability with respect to an electrode reaction of water electrolysis and this can be considered due to non-existence of a surface region of a highly stable low Ru/M atom ratio or an atom ratio of Ru inside the porous structure 10 being too high. It is verified by EDX that the composition ratio of metal atoms at the time of production is the same as the composition ratio of metal atoms in the produced porous structure.

According to at least one embodiment described above, by providing the catalyst layer 24 having the porous structure 10 in the anode, high oxygen generating activity and durability are exhibited even with a small amount of noble metal.

Here, some elements are expressed only by element symbols thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A catalyst comprising porous structure layers and one or more void layers,
   wherein the porous structure layers include aggregates of metal oxide particles,
   each of the void layers is placed between the porous structure layers,
   a thickness of the porous structure layers is 7 nm or more and 100 nm or less,
   the metal oxide contains oxide of Ru and oxide of metal atoms M different from Ru,
   and
   a metal atom ratio of the metal atom M in a surface region of the porous structure layers is higher than that of the metal atom M in the porous structure layers as a whole.

2. The catalyst according to claim 1, wherein a thickness of the surface region is 3 nm or less from a surface of the porous structure layers.

3. The catalyst according to claim 1, wherein the metal atom M is at least one metal atom selected from Ir, Rh, Au, Ta, W, Si, Ti, Zr, Sn, Pt, Pd, Hf, V, Mo, Cr, Co, Ni, Nb, Fe, Mn, Al and Zn.

4. The catalyst according to claim 1, wherein, an average composition of metal atoms in the porous structure layers as a whole is represented by $Ru_xM_y$, and
   the x and y satisfy x+y=100 and 20≤y≤60.

5. The catalyst according to claim 1, wherein a composition of metal atoms in the surface region of the porous structure layers is represented by $Ru_mM_n$ and
   the m and n satisfy m+n=100 and 60<n<100.

6. The catalyst according to claim 5, wherein the n is greater than 70.

7. The catalyst according to claim 1, wherein an average composition of metal atoms in the porous structure layers as a whole is represented by $Ru_xM_y$,
   a composition of metal atoms in the surface region of the porous structure layers is represented by $Ru_mM_n$, and
   the n and y satisfy 1.2≤n/y≤8.0.

8. The catalyst according to claim 7, wherein the n and x satisfy $0.0<n/x\leq0.6$.

9. An anode comprising the catalyst according to claim 1.

10. A membrane electrode assembly comprising the anode according to claim 9.

11. A water electrolysis cell comprising the membrane electrode assembly according to claim 10.

12. A stack comprising the water electrolysis cell according to claim 11.

13. A water electrolyzer comprising the stack according to claim 12.

14. A hydrogen utilizing system comprising the water electrolyzer according to claim 13.

15. A water electrolyzer comprising the water electrolysis cell according to claim 11.

16. A stack comprising the membrane electrode assembly according to claim 10.

17. A water electrolyzer comprising the stack according to claim 16.

18. A water electrolyzer comprising the membrane electrode assembly according to claim 10.

19. The catalyst according to claim 1, wherein the catalyst consists of the porous structure layers and one or more void layers.

20. The catalyst according to claim 1, wherein a thickness of the void layers is 10 nm or more and 100 nm or less.

* * * * *